Sept. 27, 1960  R. B. LAWRANCE  2,954,474
MEASURING

Filed April 1, 1955  2 Sheets-Sheet 1

INVENTOR.
Richard B. Lawrance
BY
Oliver W. Hayes
ATTORNEY

INVENTOR.
Richard B. Lawrance
BY
Oliver W. Hoyes
ATTORNEY

United States Patent Office 2,954,474
Patented Sept. 27, 1960

2,954,474
MEASURING

Richard B. Lawrance, Cambridge, Mass., assignor to National Research Corporation, Cambridge, Mass., a corporation of Massachusetts Filed Apr. 1, 1955, Ser. No. 498,734

6 Claims. (Cl. 250—83.6)

This invention relates to measuring and more particularly to a meter for determining the lower explosive limit of concentration of explosive gases. At present there is considerable demand for a meter which can operate continuously to sample the atmosphere in the presence of process equipment which employs potentially explosive solvents and the like. While certain portable meters have been developed which have some degree of utility, there is no commercially available meter, so far as is known, which can continuously monitor a wide range of different solvent vapors to give an indication when the solvent vapor concentration is approaching the lower explosive limit, i.e., when the solvent vapor concentration is getting sufficiently high so that the danger of explosion is being approached.

Accordingly, it is a principal object of the present invention to provide a lower explosive limit meter which will have a similar response to a large number of different potentially explosive solvent vapors. Another object of the invention is to provide a meter of the above type which can be readily adjusted so as to have a useful sensitivity for various different types of explosive vapors.

Still another object of the invention is to provide a meter of the above type which is continuously operative and whose reliability can be continuously checked.

Still another object of the invention is to provide a meter of the above type which can be operated remotely, if desired.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

Figure 1:
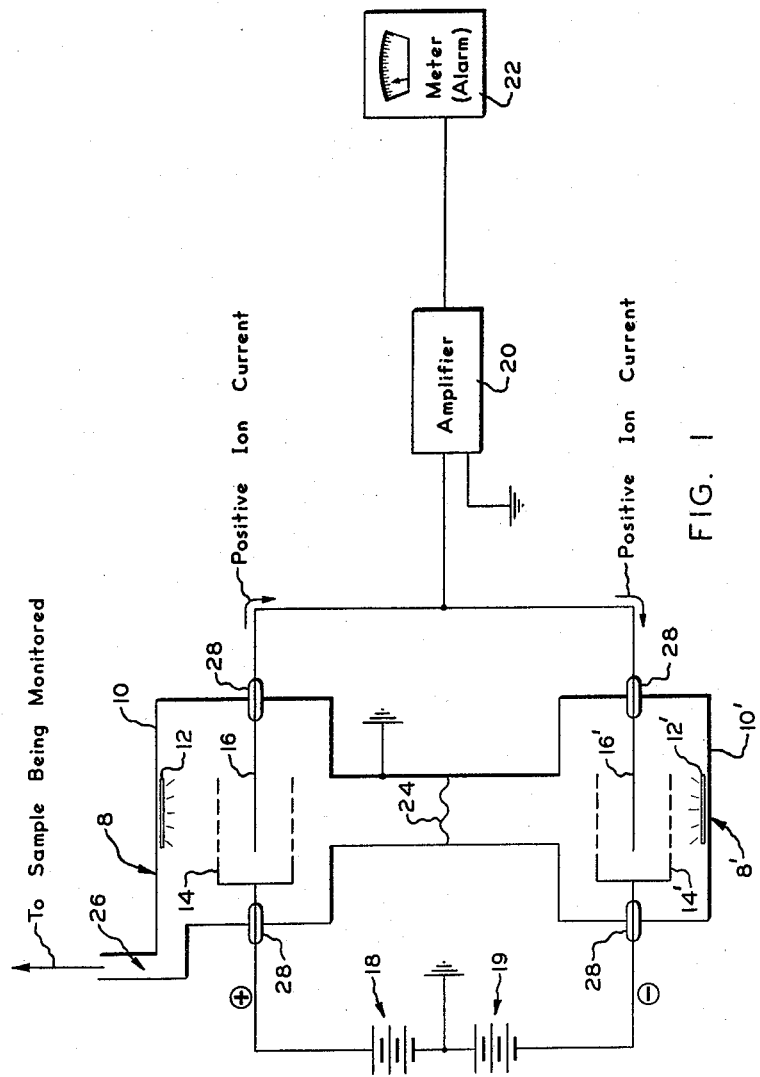
Figure 2:
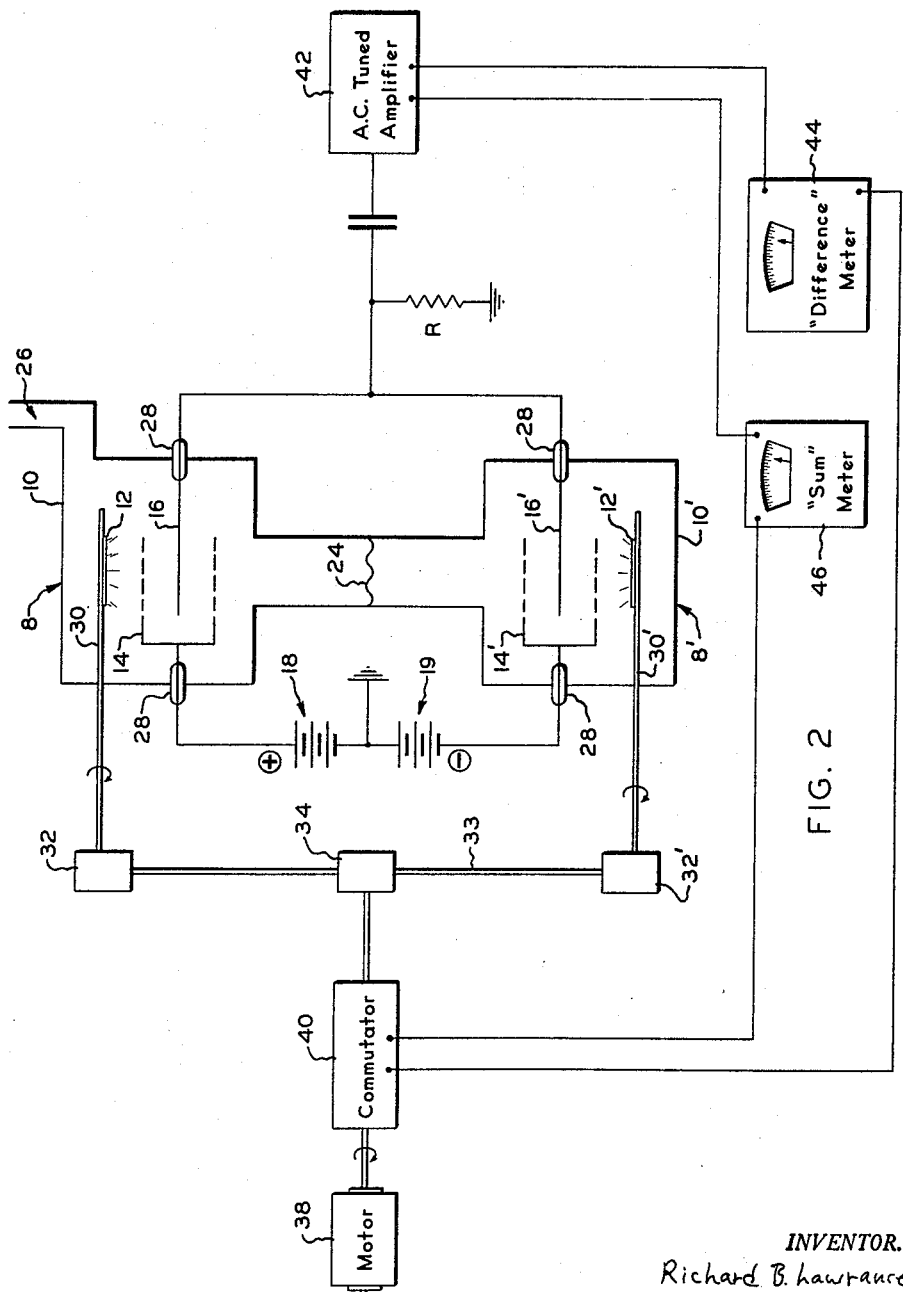

For a fuller understanding of the nature and objects of the invention, reference should be had to the following detailed description taken in connection with the accompanying drawings wherein:

Fig. 1 is a diagrammatic schematic illustration of one embodiment of the invention; and Fig. 2 is a diagrammatic schematic illustration of another embodiment of the invention.

In the present invention, advantage is taken of the fact that the ionization of a gas, when subjected to high energy radiation (particularly alpha particle radiation), is a function of the molecular nature of the gas. For many gases, the ionization is simply related to a quantity which, for the present purposes, is called the "Modified Net Atomic Number." The unmodified "net atomic number" is the sum of the atomic numbers of the atoms comprising the molecule. The "modified net atomic number" takes account of the fact that hydrogen, either alone or in combination, is observed to behave slightly differently from other atoms. The modification of the net atomic number consists in taking the atomic number of hydrogen to be two rather than one, when the hydrogen appears in an inorganic molecule (including molecular hydrogen), and in taking the atomic number of hydrogen to be equal to three when the molecule in question is organic, i.e., involves carbon. If one plots the ionization of a number of pure gases (at standard temperature and pressure) against the modified net atomic numbers for these gases, a quantitative empirical relationship is found with a rather surprisingly close grouping about a law of simple proportionality. With the exception of the rare gases, most gas molecules appear to fall within a few percent of the linear relationship, generally better than 10 percent. Qualitatively, the bigger the molecule, the greater the ionization.

A high molecular weight vapor forms an explosive mixture with air at a lower volume percentage than does a low molecular weight vapor. As mentioned previously, this is a generally opposite relationship from the observed ionization characteristics. It is accordingly found that, for a wide and useful range of solvent vapors, the counterbalancing of these two relationships results in a relatively constant degree of ionization at the lower explosive limit of a gas mixture with air, irrespective of the particular vapor or vapors involved.

Employing the above information for monitoring mixtures of vapors to determine the approach of explosive concentrations, there is provided a means for measuring the degree of ionization of the monitored vapors when the vapors are subjected to ionizing radiation such as alpha particle radiation. Since the degree of ionization is a function of the absolute pressure as well as the composition of the monitored vapors, a second gauge is preferably employed to give an electrical signal which bears a direct relationship to the absolute pressure. The electrical signal from this second gauge is then balanced against the electrical signal corresponding to the degree of ionization of the monitored gas, so as to give a net signal which is due to the explosive vapors only. Thus a predetermined difference between the two signals will give a warning of the approach of the lower explosive limit in the monitored gas. For simplicity of construction and ease of operation, it has been found desirable, in one preferred embodiment, to employ two similar ionization chambers, each of the chambers being arranged so as to be subjected to high energy radiation such as alpha particle radiation. Each of the chambers also includes means for collecting ions generated by the alpha particle radiation, and one of these ionization chambers is open to the atmosphere which is being monitored. The other chamber is preferably sealed from this atmosphere and contains a charge of relatively pure air. Means are also provided for maintaining the pressure and temperature of the gases in the two ionization chambers essentially equal. Associated with the two ionization chambers and the respective ion collecting means is an electrical means for indicating the difference between the rate of collection of ions in the two chambers. In one preferred embodiment of the invention, this last-named means is a circuit which is arranged to pass only an error signal.

Referring now to Fig. 1, there is illustrated one preferred embodiment of the invention wherein the gauge comprises a pair of meters 8—8' comprising housings 10', within which are positioned sources of ionizing radiation such as radium plaques 12—12' which will subject the interior of the housings to alpha particle radiation. Cylindrical electrodes or grids 14—14' define ion collection regions within which are positioned collector electrodes 16—16'. In one preferred embodiment of the invention, the grid 14 is maintained at a high positive potential by means of a battery 18, and grid 14' is maintained at a negative potential by means of battery 19. Consequently, electrodes 16 and 14' collect positive ions and electrodes 16' and 14 collect negative ions created in the ion collection zones defined by grids 14—14' by alpha particle radiation of the gases therewithin. An amplifier 20 is provided for amplifying the difference between the positive ion current collected at the electrode 16 and the positive ion current collected at electrode 14', the output of the amplifier 20 being fed to a meter 22 which can be arranged as an alarm to give a signal whenever the amplified difference current is above a predetermined minimum. In a preferred embodiment of the invention, chambers 10—10' are separated by a flexible diaphragm 24, the lower chamber 10' being sealed from the atmosphere and containing essentially pure air. The flexible diaphragm 24 maintains the pressure within the two housings 10—10' essentially the same. Since the two chambers are exposed to the same ambient temperature, they will be at essentially the same temperature and pressure. Accordingly, with pure air in both chambers 10—10', the degree of ionization in both chambers should be the same if the emissions of the radium plaques and the dimensions of the various elements in the two chambers are about the same. In any event, adjustments as, for example, to the exposure of the ion collection regions to alpha particle radiation can be accomplished. The meter can then easily be so adjusted that, with pure air in both chambers, the ion currents collected will be completely neutralizing and no net ion current will be fed to the amplifier 20. This can be conveniently done by having plaque 12, for example, of slightly greater emission than plaque 12' and providing an adjustable shutter (not shown) which can partially cover plaque 12 until the alpha particle emission is just equal to that of plaque 12'. In a preferred form, this adjustable shutter can be manipulated by turning a knob or screw positioned outside of the meter.

In order to permit sampling, there is provided an opening 26 which, for example, can be a hole in the side of the chamber 10 which will permit free entry of the air whose explosive vapor concentration is being monitored. Equally, it can be a tube connected to an enclosed space whose air is being monitored, this tube permitting the taking of a sample continuously or intermittently from the enclosed space. Suitable insulators 28 are also provided for supporting the various electrodes.

In the operation of the device, it is initially calibrated so that, with pure air in both chambers, no net signal is passed to the amplifier 20 or to the meter 22. As air containing a hydrocarbon or like explosive vapor enters the chamber 10, the response of this chamber due to the greater degree of ionization will provide an unbalance in the two positive ion currents. Accordingly, a net signal will be fed to the amplifier 20. When this unbalance is above a predetermined amount, indicating approach to the explosive vapor concentration limit, the amplified current fed to the meter 22 will indicate this degree of unbalance. If desired, this indication can be in the form of the ringing of an alarm or the like controlled by meter 22.

While one preferred system has been described above, numerous modifications can be employed without departing from the spirit of the invention. For example, the second gauge 8' can be a different type of gauge such as a mechanical gauge arranged to give an electrical signal which is a function of pressure. This can be a remote reading Bourdon gauge, barometer or other similar gauge, the electrical signal being preferably balanced to give a zero reading when the alpha particle ionization gauge 8 is measuring pure air.

In still another modification of the invention, illustrated in Fig. 2, the two alpha particle ionization gauges are modified to provide a pulsating output current. This has the advantage that benefit can be taken of the inherently superior performance characteristics of A.C. amplifiers. As provided in the Fig. 2 embodiment, the radium plaques 12—12' are preferably mounted on rotating shafts so that each plaque alternately faces into and away from its ionization zone. Since the individual ionization zones 14—14' are thus subjected to pulsating alpha particle irradiation, the ionization generated in these zones and the ionization current collected will pulsate correspondingly. If the timing of the alpha particle irradiation of the two chambers is exactly simultaneous and if the two chambers contain air and are balanced as previously described, then the currents will cancel at all parts of the shaft rotation cycle. The amplifier will have no pulsating input signal and the output indication on the meter will accordingly be zero. If one of the chambers contains a gas other than air, then its ion current will no longer be precisely equal to that of the chamber containing air and an alternating voltage will be presented at the input to the amplifier, giving a corresponding indication on the output meter.

The situation just described gives a perfectly workable meter which, however, does not possess the advantages of being fail-safe, e.g., an output indication in the "safe" region can mean that the instrument is operating properly and the vapor concentration is indeed safe, or else that the vapor concentration is dangerously high but the instrument is not operating properly. It is accordingly desirable to devise means whereby the proper operation of the instrument can be monitored at all times, either by an operator or automatically, so that a "safe" reading can never be obtained unless the instrument is operating properly. In order to achieve this result, the two ion currents are caused to pulsate and are opposite in sign but differ slightly from exact simultaneity or synchronism. A signal corresponding to the sum of the two pulsating ion currents is then derived and used to show correct operation of the over-all system, while a signal corresponding to the difference of the two ion currents is derived and utilized to indicate the approach to the lower explosive limit.

In Fig. 2, where like numbers refer to like elements in Fig. 1, there are provided two rotating shafts 30—30' for supporting the radium plaques 12—12'. By this arrangement, the radium plaques 12—12' are continuously rotated so that the ionization chambers defined by the grids 14—14' are alternately exposed to and then shielded from the alpha particle radiation emitted by the two plaques. As shown, the two rotating shafts are so timed that they are almost, but not quite, in phase with respect to the irradiation of their ionization chambers 14—14'. This method of operation provides a small pulsating signal which is present at all times at the input of the A.C. tuned amplifier 42, this amplifier being tuned to the frequency of the pulses.

In the preferred embodiment of the invention, the slight phase angle $\theta$ by which the shafts 30—30' depart from the in-phase relationship provides for a small constant net alternating current feed to the A.C. tuned amplifier, even in the case where both chambers contain pure air. The two shafts 30—30' are shown as being driven by means such as pulleys 32—32' connected to belt 33 which in turn is driven by a pulley 34 mounted on a shaft 36 connected to a motor 38. A commutator 40 is also preferably mounted on the same shaft 36 so as to bear a definite relationship to the angle of rotation of the shafts 30—30'. The commutator 40 serves the purpose of synchronous detection and controls the operation of a "difference" meter 44 and a "sum" meter 46.

In the operation of the Fig. 2 device, a small pulsating signal is constantly fed to the A.C. tuned amplifier 42 due to the slight phase angle $\theta$ by which the rotation of the two radium plaques differ from the exact in-phase relationship. The synchronous detectors operating in conjunction with the "difference" meter will give a net reading for the "difference" meter which can be attributed solely to the difference in composition between the gases in the two chambers 10—10'. Since chamber 10' preferably contains pure air, the difference in reading will then be a direct indication of potentially explosive gases. The "sum" meter 46 will read proportional to the sum of the pulsating ionization currents collected in the two ion chambers 10—10'. Since this will be a relatively large current, atmospheric pressure variations will perhaps give a variation of only about ±5% and variations in ionization currents due to the concentration of highly explosive vapors will give a variation of ±5%. However, if all of the circuits are working properly, the meter will show a "sum" current which is relatively large and relatively constant, not varying by more than 5% or 10%. Accordingly, when the "sum" meter indication falls within this 5% or 10% range, the observer can be sure that the meter is operating properly. If the sum meter should read appreciably less than the relatively constant sum, then the observer will know that a portion of the meter circuit is not functioning correctly. Accordingly, in this case, the observer would know that a "safe" reading on the "difference" meter might not actually be "safe."

While several preferred types of meters have been described above, numerous changes can be made without departing from the spirit of the invention. For example, the two radium plaques 12—12' might be mounted on a single shaft, in which case the two gauges 8—8' would be mounted along the shaft. With this arrangement the two plaques 12—12' can be lined up together and one gauge can be mounted for slight rotation with respect to the other gauge so that the phase angle $\theta$ can be adjusted at will. In general, it is convenient to make the angle $\theta$ relatively small, on the order of 1 to 10 degrees.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A meter for determining the lower explosive limit of concentration of an explosive vapor, the meter comprising an ionization chamber including a source of ionizing radiation, means for measuring the degree of ionization of the gases in said ionization chamber as a function of the pressure and concentration of the explosive vapors therein to give an electrical signal, means for measuring total ambient air pressure to provide an electrical signal which can be subtracted from the electrical signal corresponding to the degree of ionization of the monitored gas, means for amplifying a difference between said electrical signals to produce a signal which is a function of the increased ionization due to the presence of explosive vapors and is therefore an indication of the concentration of said explosive vapors and warning means actuated by the said signal which is a function of the concentration of said explosive vapors, said warning means being so adjusted that it operates only when at least a minimum current passes through it which corresponds with a concentration of explosive vapors close to the lower explosive limit of the gases being monitored.

2. A meter for determining the lower explosive limit of concentration of an explosive vapor, the meter comprising an ionization chamber including a source of ionizing radiation, means for measuring the degree of ionization of the gases in said ionization chamber as a function of the pressure and concentration of the explosive vapors therein to give an electrical signal, means for measuring total ambient pressure to provide an electrical signal which can be subtracted from the electrical signal corresponding to the degree of ionization of the monitored gas, means for amplifying a difference between said electrical signals to produce a signal which is a function of the concentration of said explosive vapors, and means for providing an indication which is proportional to the sum of the two electrical signals to show proper operation of the amplifier circuits.

3. A meter for determining the lower explosive limit of concentration of explosive gases such as hydrocarbon solvent vapors and the like, the meter comprising a first ionization chamber, a second ionization chamber, each of said chambers including a varying intensity source of alpha particle radiation, means for collecting ions in each of said chambers, one of said chambers being open to the atmosphere to be tested and the other chamber being sealed from said atmosphere and containing a charge of relatively pure air, the pressure and temperature of the gases in the two chambers being substantially the same, electrical means for indicating the difference between the rate of collection of ions in the two chambers, and other electrical means for indicating the sum of the rate of ion collection in the two chambers.

4. A meter for determining the lower explosive limit of concentration of explosive gases such as hydrocarbon solvent vapors and the like, the meter comprising a first ionization chamber, a second ionization chamber, each of said chambers including a source of alpha particle radiation, means for cyclically varying the intensity of the radiation reaching each ionization chamber, means for collecting ions in each of said chambers, one of said chambers being open to the atmosphere to be tested and the other chamber being sealed from said atmosphere and containing a charge of relatively pure air, the pressure and temperature of the gases in the two chambers being substantially the same, alternating current amplifying means to amplify the cyclically varying current created by the collection of the ions, electrical means operating on the signal flowing from the amplifier for indicating the difference between the rates of ion collection in the two chambers, and other electrical means operating on the signal flowing from the amplifier for indicating the sum of the rates of ion collection in the two chambers.

5. The meter of claim 4 wherein cyclically the varying means are arranged to provide maximum alpha particle radiation of one ionization chamber at a time spaced slightly from the time of maximum alpha particle radiation of the other chamber.

6. The meter of claim 4 wherein the alpha particle sources are mounted for rotation so as to alternately face towards and away from their ionization chambers.

References Cited in the file of this patent

UNITED STATES PATENTS

| | | |
|---|---|---|
| 2,375,130 | Perrin et al. | May 1, 1945 |
| 2,641,710 | Pompeo et al. | June 9, 1953 |
| 2,667,583 | Herzog | Jan. 26, 1954 |
| 2,702,898 | Meili | Feb. 22, 1955 |
| 2,761,976 | Obermaier et al. | Sept. 4, 1956 |
| 2,817,768 | Shamos | Dec. 24, 1957 |